(12) United States Patent
Nakai et al.

(10) Patent No.: US 7,511,444 B2
(45) Date of Patent: Mar. 31, 2009

(54) MOTOR CONTROL APPARATUS FOR CONTROLLING MOTOR TO DRIVE OUTPUT SHAFT WITH POSITIONING ACCURACY UNAFFECTED BY BACKLASH IN ROTATION TRANSMISSION SYSTEM

(75) Inventors: Yasuhiro Nakai, Kariya (JP); Shigeru Kamio, Nagoya (JP)

(73) Assignee: DENSO Corporation, Kariya (JP)

( * ) Notice: Subject to any disclaimer, the term of this patent is extended or adjusted under 35 U.S.C. 154(b) by 611 days.

(21) Appl. No.: 11/030,333

(22) Filed: Jan. 7, 2005

(65) Prior Publication Data
US 2005/0174084 A1    Aug. 11, 2005

(30) Foreign Application Priority Data
Jan. 9, 2004   (JP)   ............... 2004-003758

(51) Int. Cl.
    G05D 23/275   (2006.01)
(52) U.S. Cl. .................. 318/632; 318/437; 318/432; 318/701; 180/65.6
(58) Field of Classification Search ............... 180/65.6; 74/335; 318/434, 701, 632, 437
    See application file for complete search history.

(56) References Cited

U.S. PATENT DOCUMENTS

| | | | | |
|---|---|---|---|---|
| 4,911,031 A | * | 3/1990 | Yoshimura et al. ............ | 74/335 |
| 5,969,496 A | * | 10/1999 | Yamada et al. ............... | 318/715 |
| 6,389,916 B1 | * | 5/2002 | Fukuda ........................ | 74/335 |
| 6,561,050 B2 | * | 5/2003 | Yamamoto .................... | 74/335 |
| 6,616,559 B1 | * | 9/2003 | Hori et al. ..................... | 475/23 |
| 2003/0042864 A1 | * | 3/2003 | Lequesne et al. ............. | 318/701 |
| 2004/0112053 A1 | * | 6/2004 | Yamada et al. ................ | 60/602 |
| 2004/0129100 A1 | * | 7/2004 | Zimmermann et al. ........ | 74/335 |
| 2004/0139815 A1 | * | 7/2004 | Shimamura et al. ........... | 74/335 |
| 2006/0135314 A1 | * | 6/2006 | Shomura et al. ............. | 477/109 |

FOREIGN PATENT DOCUMENTS

| | | |
|---|---|---|
| JP | 2002-323127 | 11/2002 |
| JP | 2004-23932 | 1/2004 |

\* cited by examiner

*Primary Examiner*—Walter Benson
*Assistant Examiner*—Antony M Paul
(74) *Attorney, Agent, or Firm*—Nixon & Vanderhye P.C.

(57) ABSTRACT

A motor control apparatus controls a motor that drives an output shaft through a rotation transmission system. The difference between a newly established output shaft target rotation angle and a detected output shaft rotation angle is obtained, a target rotation angle for the motor is derived based on that difference, and the motor is driven accordingly. When it is determined, based on the detected output shaft rotation angle, that motor rotation has at least proceeded to a point whereby backlash in the transmission system is nullified, the target motor rotation angle is updated based on the current value of the aforementioned difference.

17 Claims, 13 Drawing Sheets

| | | TARGET SHIFT POSITION | | | |
|---|---|---|---|---|---|
| | | P POSITION | R POSITION | N POSITION | D POSITION |
| DETECTION EDGE | Psw OFF | | 8.5 | 18.5 | 33.5 |
| | Rsw ON | 11.5 | | 11.5 | 26.5 |
| | Rsw OFF | 8.5 | | 8.5 | 23.5 |
| | Nsw ON | 26.5 | 11.5 | | 13.5 |
| | Nsw OFF | 23.5 | 8.5 | | 16.5 |
| | Dsw OFF | 33.5 | 18.5 | 8.5 | |

ON: RISING EDGE    OFF: FALLING EDGE

MOTOR CONTROL APPARATUS FOR CONTROLLING MOTOR TO DRIVE OUTPUT SHAFT WITH POSITIONING ACCURACY UNAFFECTED BY BACKLASH IN ROTATION TRANSMISSION SYSTEM

CROSS-REFERENCE TO RELATED APPLICATIONS

This application is based on and incorporates herein by reference Japanese Patent Application No. 2004-003758 filed on Jan. 9, 2004.

BACKGROUND OF THE INVENTION

1. Field of Application

The present invention relates to a motor control apparatus for a motor having a rotor shaft that is coupled through a rotation transmission system such as a speed reduction mechanism to an output shaft that drives a control object.

2. Description of Prior Art

In recent years, there has been an increasing trend in the field of automobile technology towards replacing mechanical systems by systems which are electrically driven, i.e., by electric motors. This is done for reasons such as reduction of the amount of space required, ease of assembly, ease of system control, etc. This is exemplified in Japanese Patent Laid-open No. 2002-323127 (pages 3~4, etc.), whereby an automatic transmission apparatus (referred to in the following simply as automatic transmission) of a vehicle is actuated to establish respective shift positions such as the drive (D) shift position, etc., through being driven by an electric motor (hereinafter referred to simply as a motor). The motor shaft is coupled through a speed reduction mechanism to an output shaft, which drives a shift position switching mechanism that directly acts on the automatic transmission to effect changeover from one shift position to another. The motor is provided with an encoder for detecting the rotation angle of the motor (i.e., of the motor shaft). When changeover of the shift position is to be performed, the motor shaft is rotated to a target value of rotation angle (expressed as a target count value of output pulses produced by the encoder) that corresponds to the target shift position (i.e., the shift position to which the change is to be effected). This is described in the above prior art patent, in pages 3~4 thereof.

However when an amount of change in rotation angle of a motor shaft is converted to a corresponding amount of change in rotation angle of an output shaft, by being transferred through a rotation transmission system such as a speed reduction mechanism, there will be a certain degree of backlash in the components of the rotation transmission system, which typically include a gear train. As a result, even if the rotation angle of the motor shaft is controlled precisely, based on detecting that rotation angle by an appropriate sensor, there will be some amount of error in the rotation angle to which the output shaft becomes set, with the amount of error depending upon the degree of backlash. Hence, when an apparatus such as a shift position switching mechanism of an automatic transmission is actuated by the output shaft, it becomes difficult to achieve accurate control.

The assignees of the present invention have previously proposed, in Japanese Patent Laid-open No. 2002-177739, an arrangement whereby a motor (coupled through a rotation transmission system to an output shaft) is rotated until a member attached to the output shaft comes into contact with an immovable portion of a shift position switching mechanism, at a location corresponding to a limit position of a range of motion of the shift position switching mechanism. The amount of backlash in the rotation transmission system can thereby be "learned", so that compensation can then be applied to a target value of rotation angle of the motor shaft, in accordance with the amount of backlash.

However in that case, even if the amount of backlash in the rotation transmission system is accurately learned, when the motor is subsequently driven to the target value of rotation angle after compensation has been applied for the backlash, an error may arise in the relationship between the respective rotation angles of the motor shaft and the output shaft, for amounts of rotation that are within the range of the backlash amount. This can result in errors of control. In addition, due to the fact that mechanical parts of the system are moved into mutual contact, in the aforementioned learning operation to determine the amount of backlash, loads are repetitively applied to parts of the mechanism, which can result in malfunction occurring. Moreover, due to the fact that the learning operation must be executed immediately before a shift position changeover of the automatic transmission can be performed, a delay will occur in executing the changeover operation. Hence, there are various disadvantages with such a method.

SUMMARY OF THE INVENTION

It is an objective of the present invention to overcome the above problems of the prior art, by providing a motor control apparatus for application to a system having a rotation transmission system that couples a motor to a control object such as a shift position switching mechanism and that has some degree of backlash, whereby it becomes unnecessary for the apparatus to perform a learning operation prior to driving the control object before beginning to drive the control object, while enabling an amount of actuation of the control object to be accurately controlled, without that amount of actuation being affected by the backlash that is present in the rotation transmission system. The invention can thereby provide a motor control apparatus having increased accuracy of control, increased durability, and enabling more rapid actuation of the control object.

Specifically, the invention is applicable a motor control apparatus comprising motor rotation angle detection means for deriving a detected motor rotation angle as an angular position of a shaft of a motor with the motor shaft being coupled through a rotation transmission system to an output shaft which drives a control object, with the motor control apparatus controlling the motor to rotate the motor shaft into coincidence with a target value of motor rotation angle, and with the motor control apparatus including output shaft rotation angle detection means for deriving a detected rotation angle of the output shaft. According to a first aspect, such a motor control apparatus according to the present invention is characterized in comprising target motor rotation angle compensation means, for applying compensation to the target value of motor rotation angle based upon at least one detection value that is obtained by the output shaft rotation angle detection means during an operation for rotating the output shaft into coincidence with a target rotation angle.

By applying compensation to the target value of motor rotation angle (i.e., updating a previously set target value) during rotation of the motor, it becomes possible to eliminate the effects of backlash in the rotation transmission system, such as backlash in a gear train of a speed reduction mechanism. So long as the effects of backlash are occurring during motor rotation, the relationship between successive rotation angles of the motor shaft and the rotation angle of the output shaft is undefined, so that accurate control of the output shaft is impossible. With the present invention, it can be ensured that compensation is applied to the target value of motor rotation angle at a point when the effects of backlash have ceased, with that point being determined based on a result obtained by the output shaft rotation angle detection means.

The output shaft rotation angle detection means can for example be a sensor such as a potentiometer that produced output values varying linearly in accordance with variation of the rotation angle of the output shaft, with the target motor rotation angle compensation means performing the compensation of the target value of motor rotation angle in accordance with a difference between the detected output shaft rotation angle and a target value of output shaft rotation angle. The apparatus can for example be configured to detect the point when the motor shaft has rotated to an extent whereby the backlash no longer has an effect, by detecting the commencement of variation between successively derived values of the detected output shaft rotation angle. Updating of the target value of motor rotation angle can then be performed, in accordance with the current difference between the actual (detected) rotation angle of the motor shaft and target output shaft rotation angle, and the motor driven to attain that target output shaft rotation angle.

In that case for example, the target motor rotation angle compensation means can be configured to repetitively apply compensation to the target value of motor rotation angle in accordance with the difference between each of successively detected values of output shaft rotation angle and the target output shaft rotation angle, starting from the commencement of motor shaft rotation, until the commencement of variations in the detected output shaft rotation angle is detected.

Alternatively, a specific amount of difference between the initial rotation angle of the output shaft (i.e., at the commencement of motor shaft rotation, when a change in the target output shaft rotation angle has been newly specified) and the detected output shaft rotation angle can be predetermined, as a threshold value, which is sufficiently large to ensure that the threshold value will only be reached when all of the effects of backlash in the rotation transmission system have been taken up, i.e., the motor shaft and the output shaft are rotating together. In that case, compensation of the target motor rotation angle is performed when the threshold value is reached, and the motor is then driven to attain that target value.

As a further alternative, switch means can be coupled to the output shaft, formed of a plurality of switch devices that are each actuated to produce a switch signal at an ON level while the output shaft is within a range of angular positions that is specific that switch device, and otherwise producing the switch signal at an OFF level. The target motor rotation angle compensation means performs compensation of the target value of motor rotation angle at a time point, following the commencement of motor shaft rotation, at which a transition of a switch signal of one of the switching devices between the OFF and ON levels occurs. By arranging that the ON ranges of the switch sections correspond to respective possible target rotation angles of the output shaft, it can be ensure that, after the motor shaft commences to rotate, a first switch signal transition can only occur after the motor shaft has rotated to such an extent that all backlash in the rotation transmission system has been taken up. Hence in that case, compensation of the target value of motor rotation angle is applied at the time point when that first transition is detected, and the motor then driven to attain the target rotation angle.

Although the invention is described herein based on embodiments in which the rotation angle of an output shaft is detected, it would be equally possible to utilize detection of positions (e.g., along a lateral direction) of a control object that is driven by the output shaft. In some applications this may be a significant advantage, since it can be ensured that compensation of the target value of motor rotation angle is applied, during rotation of the motor shaft, at a point when not only all backlash in the rotation transmission system but also any play that exists in a mechanism that couples the output shaft to the control object, have both been taken up, so that the motor can be driven based on an accurately defined relationship between changes in rotation angle of the motor shaft and corresponding motion of the control object.

The motor can for example be a synchronous type of motor, and the invention can be advantageously applied, for example, as a shift position switching control apparatus of a vehicle automatic transmission.

DESCRIPTION OF PREFERRED EMBODIMENTS

A first embodiment of a motor control apparatus will be described referring to FIGS. 1 to 3, which is applied to a motor 13 that drives a shift position switching mechanism of the automatic transmission of a vehicle. In the following, it should be understood that terms such as "rotation of the motor 13" and "rotation angle of the motor 13" are used for brevity of description, in referring to rotation of the shaft of the motor 13, and to an angular position attained by the shaft of the motor 13.

Figure 2:
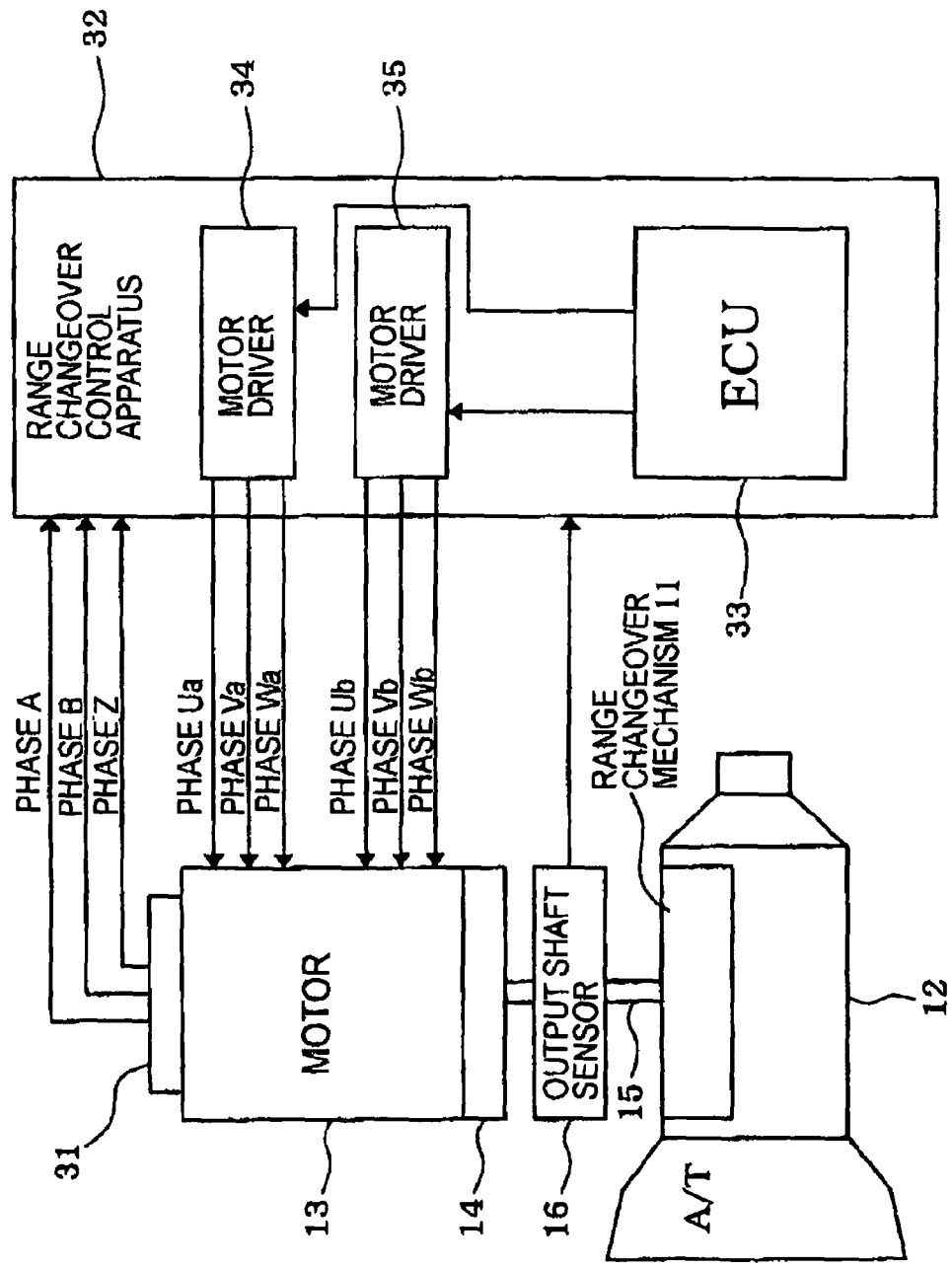
FIG. 2 shows a general block diagram of the shift position switching control apparatus embodiment, coupled to control a vehicle automatic transmission.
Figure 3:
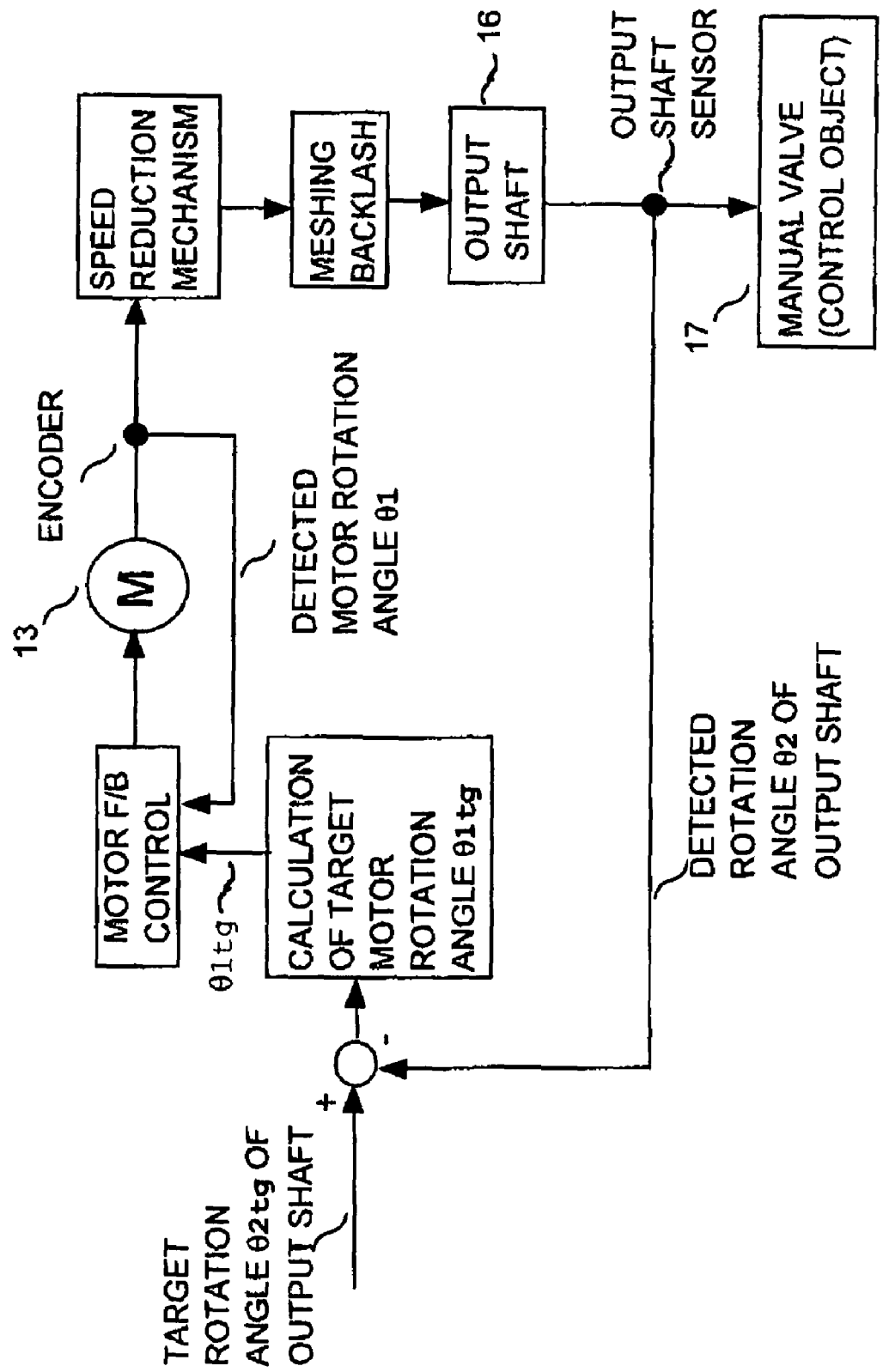
FIG. 3 is a conceptual block diagram for describing the operation of the first embodiment.

FIG. 2 conceptually illustrates an overall system for controlling the automatic transmission operation of a vehicle, with the overall system incorporating a shift position switching control apparatus 32, constituting the first embodiment. The overall system also includes an automatic transmission 12 that is directly controlled by the shift position switching mechanism 11, with the shift position switching mechanism 11 being operated by the motor 13, which is controlled by the shift position switching control apparatus 32.

The shift position switching mechanism 11 is used to control changing of the automatic transmission 12 between respective shift positions, i.e., a parking position (P), a reverse position (R), a neutral position (N) and a drive position (D).

The motor 13 is a synchronous motor, which will be assumed to be a switched reluctance (hereinafter SR) type of motor in this embodiment. It is also assumed that the motor 13 of this embodiment has two separate stator windings, that are driven as respectively separate systems by corresponding motor drive circuits 34, 35 of the shift position switching control apparatus 32, however the invention is equally applicable to various other types of motor. The motor 13 is provided internally with a speed reduction mechanism 14, coupled between the shaft of the SR motor 13 and the shift position switching mechanism 11. A shaft sensor 16 serves to detect the rotation angle of an output shaft 15 of the speed reduction mechanism 14.

Figure 1:
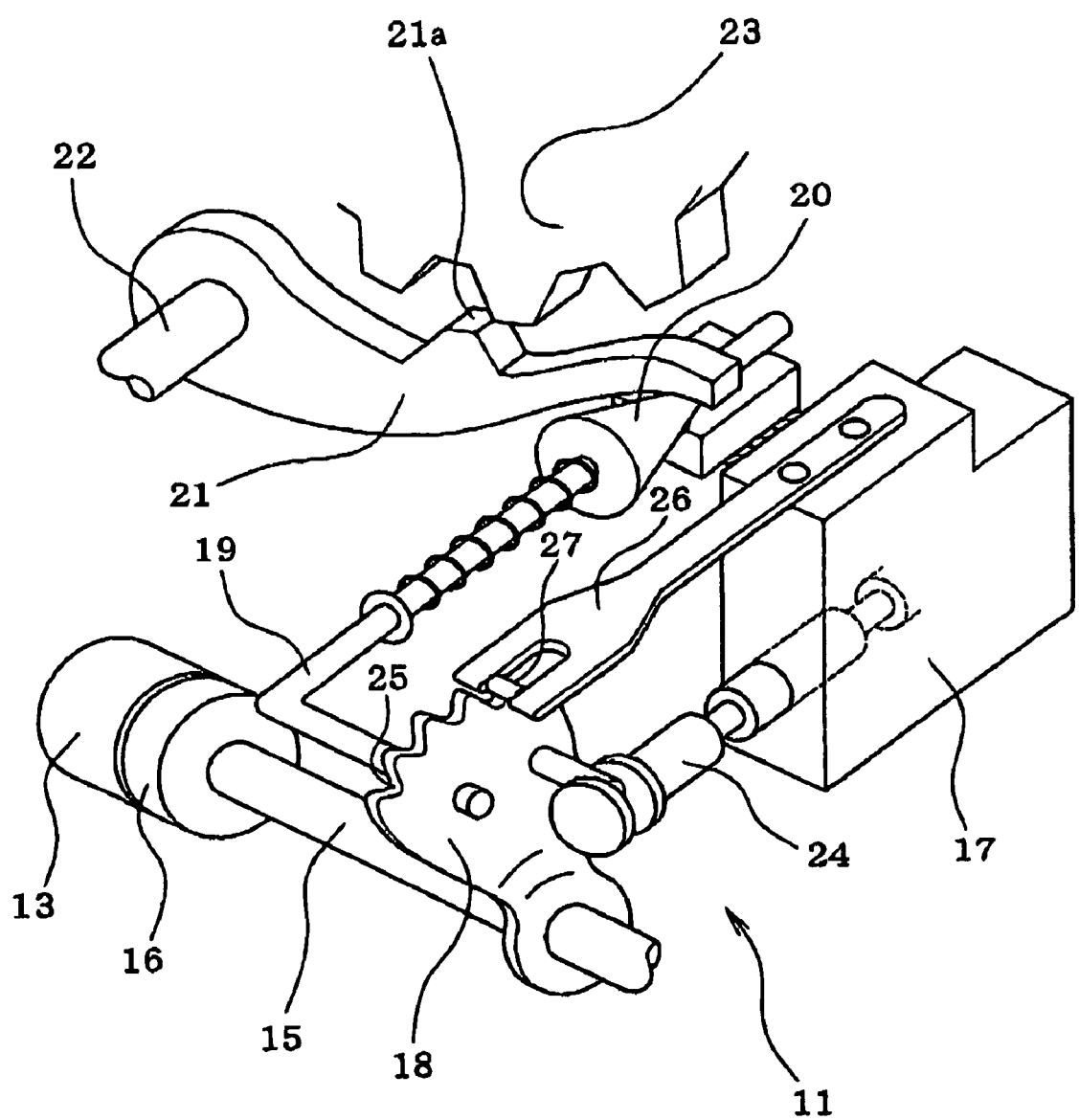
FIG. 1 is an oblique view of a shift position switching apparatus that is controlled by a first embodiment of a shift position switching control apparatus.

As shown in FIG. 1, the output shaft 15 has a detent lever 18 fixedly attached thereto, for adjusting the lateral position of a spool valve member 32 to thereby adjust a degree of opening of a manual valve 17, which is within an oil pressure circuit (i.e., hydraulic circuit) of the automatic transmission 12. An L-shaped parking rod 19 is attached to the detent lever 18, and a conical member 20 that is mounted on the tip of parking rod 19 engages with a lock lever 21. The lock lever 21 serves to lock and unlock a parking gear 23, being rotated about a shaft 22 as a center of rotation, to thereby be moved upward or downward, and so moved towards or away from the parking gear 23, in accordance with the position of the conical member 20.

The parking gear 23 is fixedly mounted on the shaft of the automatic transmission 12. When the parking gear 23 is locked by the action of the lock lever 21, the rear road wheels of the vehicle are prevented from rotation, so that the vehicle will not move when the automatic transmission is set at the parked (P) position.

The detent lever 18 has a spool valve member 24 of the manual valve 17 coupled thereto, and when the shaft 15 and the detent lever 18 are rotated together by the SR motor 13 (acting through the speed reduction mechanism 14), the lateral position of the spool valve member 24 is changed accordingly, and the shift position of the automatic transmission 12 is thereby changed, i.e., to the parking position (P), reverse position (R), neutral position (N) or drive position (D). The detent lever 18 is formed with four recessed portions 25, for holding the spool valve member 24 in a position corresponding to the shift position that is selected.

A detent spring 26, which holds the detent lever 18 at a position corresponding to the selected shift position, is fixed to the manual valve 17, and a coupling portion 27 that is provided at the tip of the detent spring 26 engages in one of the recessed portions 25 of the detent lever 18 that corresponds to the selected shift position, so that the detent lever 18 is held at a rotation angle (i.e., angular position) corresponding to that selected shift position, and the spool valve member 24 is thereby held at a position corresponding to the selected shift position.

In the case of the parking (P) shift position, the parking rod 19 is moved to become adjacent to the lock lever 21, and a wide-diameter portion of the conical member 20 presses upward against the lock lever 21, so that the protruding portion 21a of the lock lever 21 engages with the parking gear 23, thereby locking the parking gear 23 in place. In that way, the shaft of the automatic transmission 12, i.e., the drive shaft of the vehicle, is held in a locked condition, so that the vehicle is held in the parking condition.

When any shift position other than the P shift position is selected, the parking rod 19 is moved away from the lock lever 21, so that the wide-diameter portion of the conical member 20 is moved back from the lock lever 21, and the lock lever 21 thereby becomes lowered. As a result, the protruding portion 21a of the lock lever 21 becomes separated from the parking gear 23, so that the locked condition of the parking gear 23 is released. The shaft of the automatic transmission 12 can then rotate, so that the vehicle can be driven.

The shaft sensor 16 is made up of a rotation sensor such as a potentiometer, producing an output voltage that changes linearly in accordance with changes in the angular position of the output shaft 15 of the speed reduction mechanism 14 of the SR motor 13. That output voltage from the shaft sensor 16 is used to indicate the rotation angle of the shaft 15 at the current point in time, with that rotation angle determining whether the automatic transmission 12 is set to the parking position (P), reverse position (R), neutral position (N) or drive position (D).

As shown in FIG. 2, the SR motor 13 is provided with an encoder 31, for detecting the angular position of the rotor (not shown in the drawings) of the SR motor 13. The encoder 31 of this embodiment will be assumed to be a magnetic type of rotary encoder, which outputs three trains of pulse signals (designated as the phase A, phase B, and phase Z pulse signals, respectively) that are synchronized with the rotation of the rotor of the motor 13 (referred to in the following simply as the rotation of the motor 13), and supplies these signals to the shift position switching control apparatus 32. The ECU 33 of the shift position switching control apparatus 32 performs counting on successive rising edges and falling edges of the phase A and phase B pulse signals from the encoder 31, and controls the motor drive circuits 34, 35 to energize respective (U, V, W) phase windings of the motor 13 at appropriate timings and in an appropriate sequence for producing motor rotation in the required direction.

The current direction of rotation of the shaft of the SR motor 13 is judged by the shift position switching control apparatus 32 based on the order in which the phase A and phase B control signals are being generated by the ECU 33. In the case of clockwise rotation (as viewed in FIG. 3) of the motor 13, which is the direction for effecting change from the P to the D shift position of the automatic transmission, a count value of pulses received from the encoder 31 is decremented by the ECU 33. Conversely, in the case of counter-clockwise rotation (which is the direction for effecting change from the D to the P shift position of the automatic transmission), the count of received pulses is successively decremented. In that way, since the relationship between the count value of received encoder pulses and corresponding rotation angles of the shaft of the SR motor 13 is held fixed, irrespective of whether the SR motor 13 performs forward or reverse rotation, the rotation angle of the motor shaft can be detected based on the count value irrespective of whether the motor shaft is rotated in the forward or the reverse direction.

The phase Z pulse signal that is produced by the encoder 31 is used by the ECU 33 to detect when the motor shaft attains a reference angular position.

The operation of a feedback control (hereinafter referred to as F/B control) system of this embodiment will be described referring to the conceptual system diagram of FIG. 3. As shown, the system is made up of two F/B control systems. A first of these systems calculates the target motor rotation angle θ1tg by using equation (1) below, utilizing a value of detected output shaft rotation angle θ2 derived by the output shaft sensor 16 and the difference amount (θ2−θ2tg), as follows:

$$\theta1tg=(\theta2-\theta2tg)\times Kg+\theta1 \quad (1)$$

In the above, Kg is the reduction ratio of the speed reduction mechanism 14 (i.e., the ratio of an amount of change in rotation angle of the shaft of the motor 13 to the corresponding amount of change in rotation angle of the output shaft 15, in the absence of effects of backlash), while θ1 is the detected motor rotation angle that is derived by the encoder 31 and θ2tg is the target output shaft rotation angle (determined based on the target shift position as described above).

F/B control is applied to compensate the target motor rotation angle θ1tg based on the amount of difference (θ2−θ2tg) between the detected output shaft rotation angle θ2, and the target output shaft rotation angle θ2tg.

The motor 13 of this embodiment is a synchronous type of motor, having a stator winding that is supplied with drive current. The second F/B control system controls rotation of the motor 13 by successively energizing respective phase windings of the stator winding, in a sequence determined based on the detected motor rotation angle θ1, with the motor shaft being thereby rotated in a corresponding direction. The second F/B control system thereby applies feedback control to bring the detected motor rotation angle θ1 into coincidence with the target motor rotation angle θ1tg.

Figure 4:
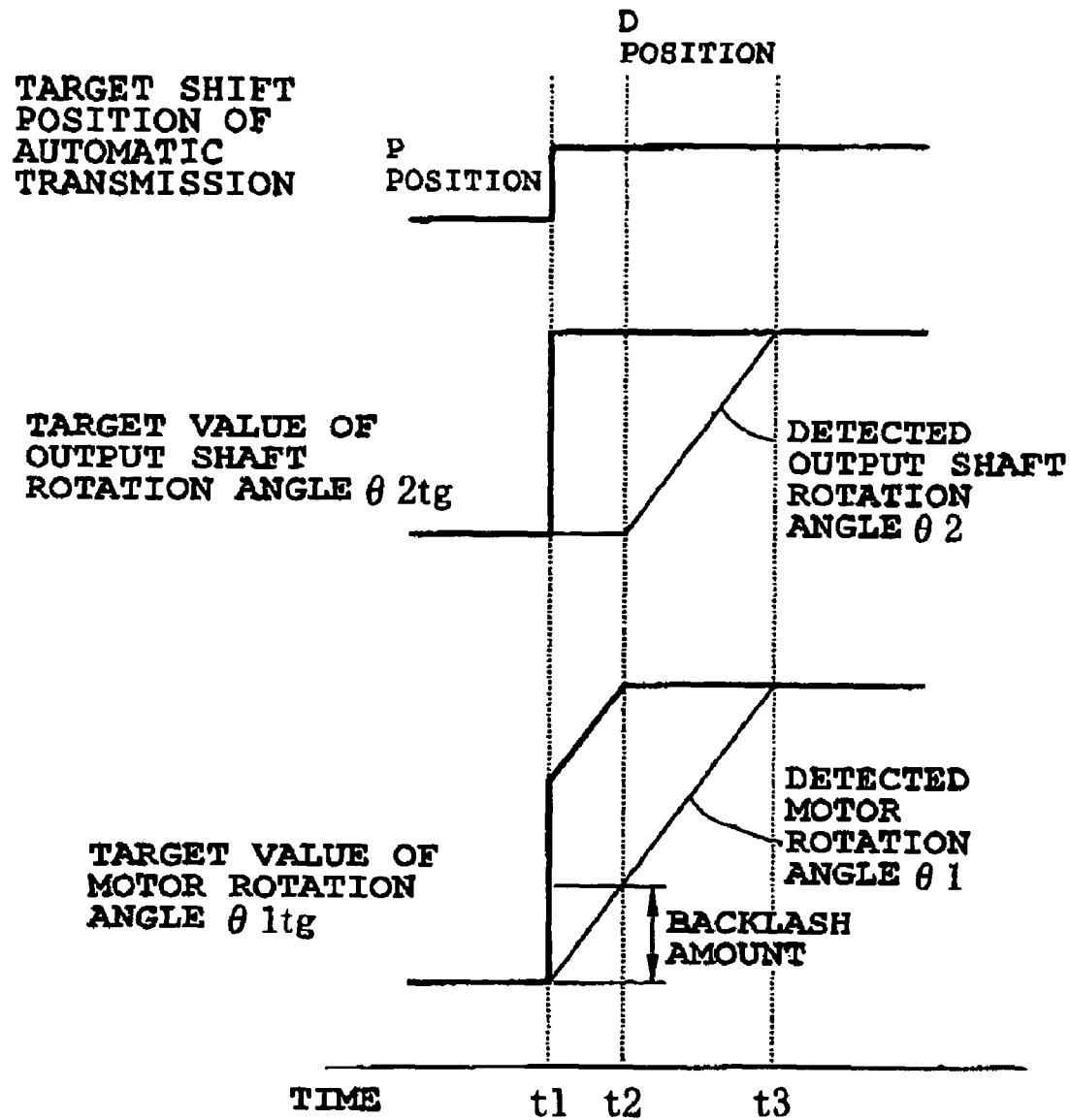
FIG. 4 is a timing chart showing an example of control operation performed by the first embodiment.

An example of performing control of the motor 13 by such a two-system F/B control system will be described referring to the timing diagram of FIG. 4. In FIG. 4, at a time point t1, the driver of the vehicle operates the shift lever of the automatic transmission 12 to perform changeover from the P (parking) to the D (drive) shift position. When that occurs, the ECU 33 reads out, from a map (i.e., table of values that have been stored in a memory of the ECU 33 beforehand) a target value of output shaft rotation angle θ2tg, in accordance with the target shift position (in this case, the D shift position). The ECU 33 then calculates an appropriate initial target value of motor rotation angle θ1tg by using equation (1) above, based on the difference amount (θ2−θ2tg) at that time point t1, and begins to drive the motor 13 towards that initial target motor rotation angle.

In general, immediately after driving of the motor 13 has started, no rotation of the output shaft 15 will occur until the motor 13 has rotated to a sufficient extent that all of the backlash in the rotation transmission system has been taken up. Thus, up to that point, there will be no change in the detected output shaft rotation angle θ2. However the detected motor rotation angle θ1 will vary in accordance with the rotation of the motor 13, and with this embodiment, the target motor rotation angle θ1tg is successively updated in accordance with these changes in θ1, following the commencement of motor rotation.

Subsequently, when the motor 13 has rotated to an extent that all of the backlash in the rotation transmission system has been taken up (at time point t2 in FIG. 4) the motor 13 and the output shaft 15 begin to rotate together, so that the detected output shaft rotation angle θ2 begins to change. Thereafter, as the output shaft 15 and the speed reduction mechanism 14 rotate, the target motor rotation angle θ1tg is held constant, so that the most recently derived value of target value of motor rotation angle (obtained at time point t2) becomes the final value of the target motor rotation angle. At the time point t3, the detected motor rotation angle θ1 derived by the encoder 31 comes into coincidence with the target motor rotation angle θ1tg. When that condition is detected, the ECU 33 applies control to halt the rotation of the motor 13. This completes the shift position switching operation.

Figure 5:
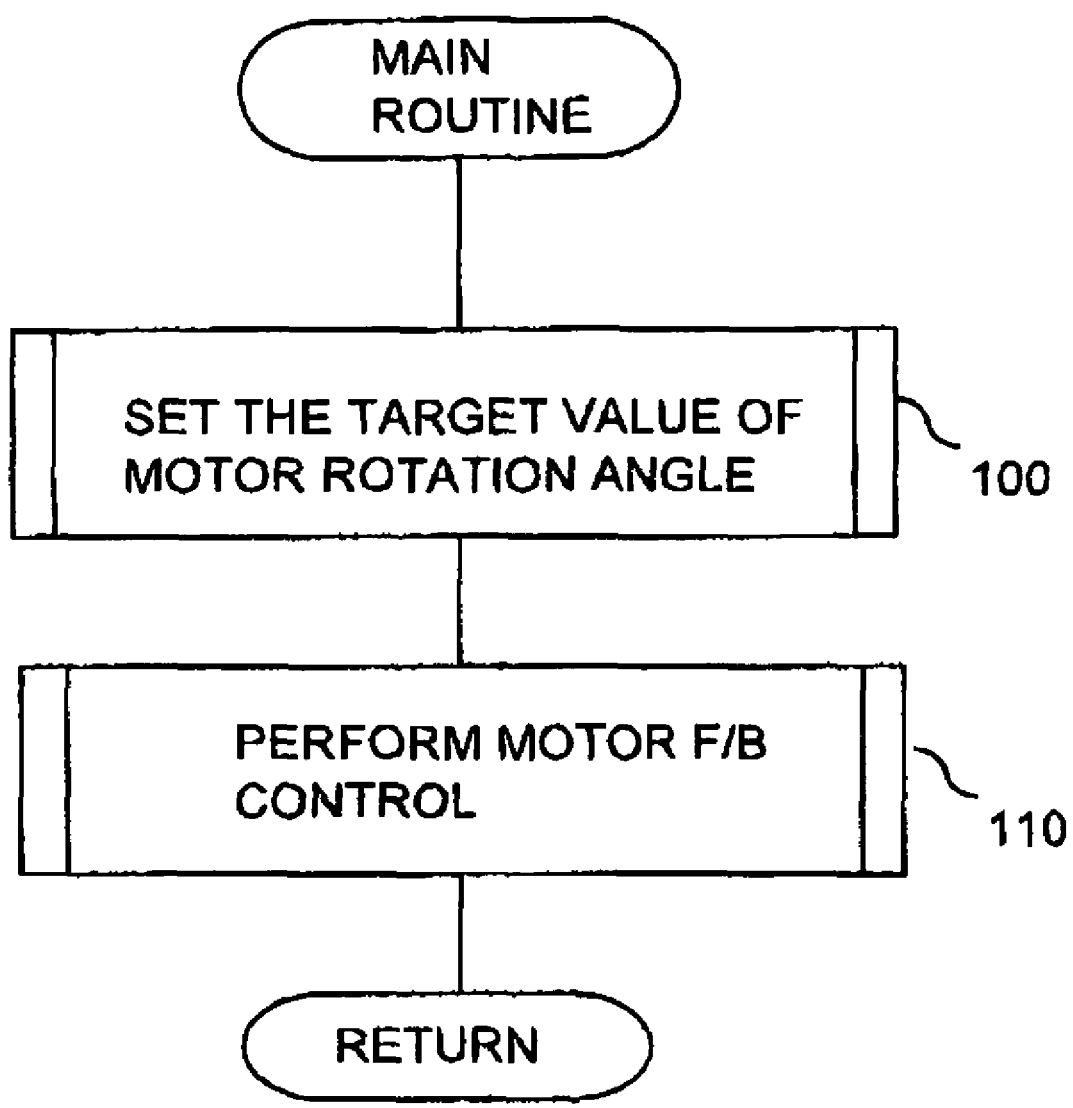
FIG. 5 is a flow diagram of a ma in processing routine that is executed in each of respective embodiments of the invention.
Figure 6:
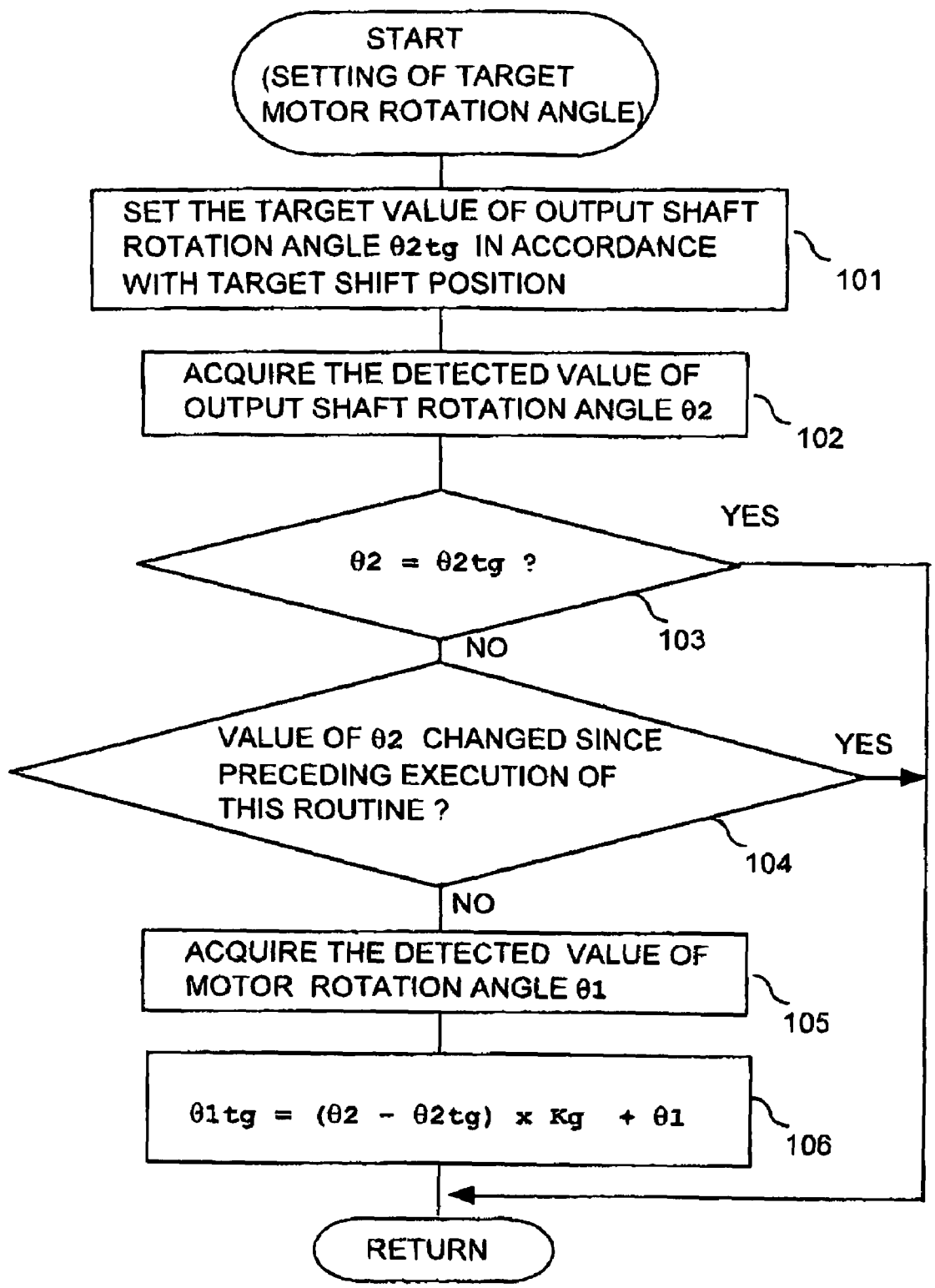
FIG. 6 is a flow diagram of a target motor rotation angle setting routine used in the first embodiment.
Figure 7:
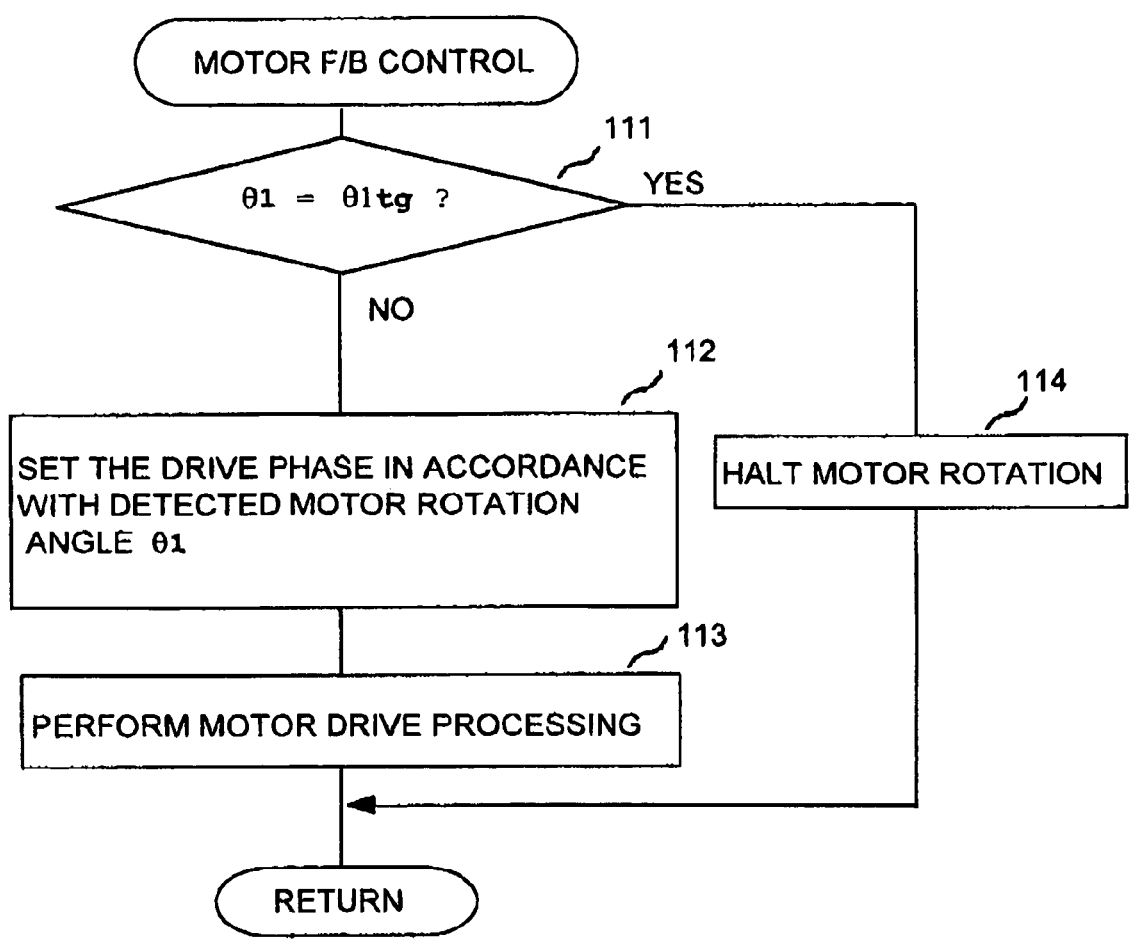
FIG. 7 is a flow diagram of a feedback control routine that is executed in each of respective embodiments.

The F/B control applied to the motor 13 as described above is executed by the ECU 33, by processing performed in accordance with the routines shown in FIGS. 5 to 7. These will be respectively described in the following.

FIG. 5 shows a main routine, which is repetitively executed by the ECU 33 at fixed periodic intervals so long as power is being supplied to operate the ECU 33. When execution of this main routine is started, then firstly in step 100 a target motor rotation angle setting routine that is shown in FIG. 6 is executed, to set a value for the target motor rotation angle θ1tg. Operation then advances to step 110 in the main routine, in which the control routine shown in FIG. 7 is executed, for driving the motor 13 towards the target motor rotation angle θ1tg.

When the target motor rotation angle setting routine of FIG. 6 is started, firstly in step 101 a target value of output shaft rotation angle θ2tg is read out from the aforementioned map of values, in accordance with the shift position that is currently specified, i.e., the (newly established) target shift position. Next in step 102, a detected value of output shaft rotation angle θ2 is obtained from the output shaft sensor 16. In step 103 a decision is made as to whether θ2 coincides with θ2tg, to determine whether it is necessary to begin driving the motor 13 to perform a shift position changeover operation. If there is a YES decision in step 103 then execution of this subroutine is ended, while if there is a NO decision then step 104 is executed, to judge whether there has been a change in the value of θ2 since the immediately preceding execution of this routine. This serves to judge whether driving of the motor 13 has been performed since the preceding execution of this routine, and if so, whether that has resulted in a change in θ2 (thereby signifying that operation is currently within the range t2 to t3 shown in FIG. 4).

If there is a YES decision in step 104, signifying that the output shaft is being rotated, then execution of this routine is ended, so that the current value of θ1tg (i.e., calculated in a previous execution of this routine) is held unchanged, while if there is a NO decision then step 105 is executed, in which the detected motor rotation angle θ1 is obtained, based on a count of output pulses produced from the encoder 31. Step 106 is then executed, in which compensation of the target value of motor rotation angle is performed, with an updated target motor rotation angle θ1tg being calculated using equation (1) above. Execution of the routine is then ended.

In step 110 of FIG. 5, when the F/B control routing of FIG. 7 is started, firstly in step 111 a decision is made as to whether the detected motor rotation angle θ1 obtained from the encoder 31 coincides with the target motor rotation angle θ1tg. If they do not coincide, operation advances to step 112, in which the phase by which the motor 13 is to be driven is selected. That is to say, a determination is made as to the sequence in which drive current is to be successively supplied to respective phase windings of the motor 13. In step 113, drive control signals are supplied by the ECU 33 to the motor drive circuits 34 and 35, which thereby supply drive currents to the phase windings of the motor 13 in accordance with the determination made in step 112.

Subsequently when it is detected that the detected motor rotation angle θ1 coincides with the target motor rotation angle θ1tg, so that a YES decision is reached in step 111, operation proceeds to step 114 in which the motor drive circuits 34, 35 are controlled to halt rotation of the motor 13. This completes the shift position changeover operation.

With the first embodiment described above, the target motor rotation angle θ1tg is established based on the difference amount (θ2−θ2tg) between the detected output shaft rotation angle θ2 and the target output shaft rotation angle θ2tg, so that when there is some degree of backlash in the rotation transmission system that couples the motor to the control object (such as the shift position switching mechanism 11), accurate compensation for the backlash can be applied to the target output shaft rotation angle θ2tg by utilizing the detected output shaft rotation angle θ2 (derived by the output shaft sensor 16) after a shift position changeover operation has been started.

Furthermore with the first embodiment, the processing for setting the target motor rotation angle θ1tg is performed repetitively at predetermined intervals. As a result, each time that driving of the motor 13 is started, compensation of the target motor rotation angle θ1tg can be immediately performed, by using the detected output shaft rotation angle θ2. Hence, the degree of actuation of the manual valve 17 of the shift position switching mechanism 11 can be accurately controlled, without the control being affected by the backlash in the rotation transmission system, and this is achieved without the necessity for performing an operation whereby the degree of backlash of the rotation transmission system is "learned", before a shift position changeover is executed. Thus in addition to achieving increased accuracy of control, a motor control apparatus in accordance with the first embodiment can provide increased durability, and more rapid completion of a shift position changeover.

With the first embodiment, the target motor rotation angle θ1tg is calculated by using the above equation (1), employing the deviation of the detected output shaft rotation angle θ2 from the target output shaft rotation angle θ2tg, in conjunction with the detected motor rotation angle θ1 that is derived based on the output from the encoder 31. However it would be equally possible to utilize a map of values (stored beforehand in a memory of the ECU 33) of the target motor rotation angle θ1tg, with values of deviation of the detected output shaft rotation angle θ2 from the target output shaft rotation angle θ2tg and values of the detected motor rotation angle θ1 being used as parameters, i.e., look-up values, of the map. In that case each value of target motor rotation angle θ1tg can be read out from such a map, by using the currently derived deviation of the detected output shaft rotation angle θ2 from the target output shaft rotation angle θ2tg, and the currently detected motor rotation angle θ1, as parameters.

Also, with the first embodiment, the rotation angle of the output shaft 15 (corresponding to the rotation angle of the detent lever 17) is detected by using a device such as the output shaft sensor 16, i.e., a rotary potentiometer.

With a first alternative form of the first embodiment, repetitive operations for deriving the target value of motor rotation angle are not performed as described above, e.g., in the time interval from t1 to t2 in FIG. 4. Instead, after an initial target value of motor rotation angle has been derived (e.g., at time point t1 in FIG. 4), that value is held unchanged until it is detected (at time point t2) that changes between successive values of the detected output shaft rotation angle have commenced. At that point, the target value of motor rotation angle is updated, to a final value, in accordance with the difference between the detected output shaft rotation angle and target output shaft rotation angle at that time. In other respects, the operation of this alternative form of the first embodiment is identical to that of the first embodiment, so that detailed description is omitted.

With a second alternative form of the first embodiment, motion of the control object, e.g., lateral motion of the spool valve member 24, is directly detected, for example by a device such as a linear potentiometer that is directly coupled the spool valve member 24 and produces output values that vary linearly in accordance with the lateral position of the spool valve member 24. Other than in the fact that motion of the control object is directly detected, the operation of this second alternative form of the first embodiment is identical to that of the first embodiment, so that detailed description is omitted. With the second alternative form, it is ensured that all backlash (including the amount of play that exists in the coupling between the detent lever 18 and the spool valve member 24, as well as the backlash in the speed reduction mechanism 14) has been taken up, before setting of the (final) target value of motor rotation angle θ1tg is performed (e.g., at point t2 in FIG. 4).

Second Embodiment

With the first embodiment, processing is repetitively performed by the ECU 33 at predetermined time intervals whereby the target motor rotation angle θ1tg is set in accordance with the difference amount (θ2−θ2tg), i.e., the deviation of the detected output shaft rotation angle θ2 from the target output shaft rotation angle θ2tg. However immediately after driving of the motor 13 has started, the rotation angle relationship between the output shaft 15 and the motor 13 (i.e., the rotor shaft of the motor 13) is indeterminate, and this condition continues until the motor 13 has rotated by a sufficient amount to take up all of the backlash in the rotation transmission system. As a result, it is not possible to accurately compensate the target motor rotation angle θ1tg by using the detected output shaft rotation angle θ2 from the output shaft sensor 16, during that initial condition after driving of the motor 13 has commenced, until the backlash has been taken up. Thereafter, the output shaft 15 and the motor 13 begin to rotate together (i.e., mutually coupled, without backlash), and in that condition, the target motor rotation angle θ1tg can be accurately compensated based on the detected output shaft rotation angle θ2 that is derived based on the output shaft sensor 16. When the output shaft 15 and the motor 13 begin to rotate together, changes immediately begin to occur in the value of the detected output shaft rotation angle θ2, so that the time point during the rotation of the motor 13 at which backlash no longer has an effect can be accurately detected. Compensation is then applied, at that time point, to establish the final target value of motor rotation angle.

Figure 8:
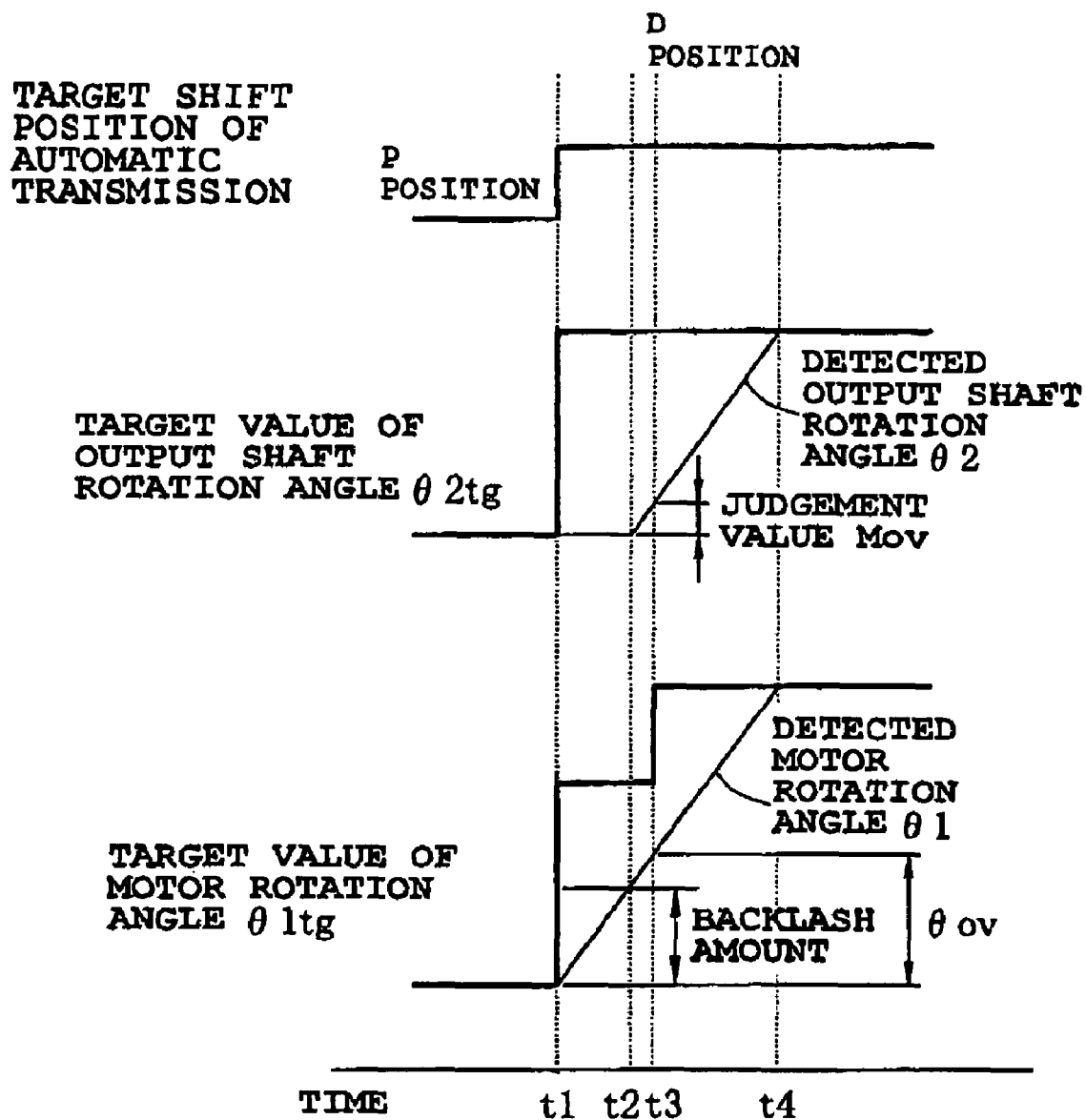
FIG. 8 is a timing chart showing an example of a control operation performed by a second embodiment.

A second embodiment will be described referring to FIGS. 8 and 9 whereby, after an initial target value of motor rotation angle has been set as described for the first embodiment, and driving of the motor 13 towards the initial target value has started, that initial target motor rotation angle θ1tg is held fixed, until the difference between detected output shaft rotation angle θ2 and the initial value of that angle (i.e., at the time point when motor rotation commenced) attains a predetermined threshold value, which will be designated as Mov. At the point when θ2 reaches the value Mov (and only at that time), compensation is applied to update the target motor rotation angle θ1tg, based on the amount of difference (θ2−θ2tg) between the detected output shaft rotation angle θ2 and the target output shaft rotation angle θ2tg at that time. Thereafter the value of θ1tg is held fixed, as the final target value of motor rotation angle, until the detected motor rotation angle θ1 coincides with θ1tg.

An example of controlling the motor 13 with the second embodiment will be described referring to FIG. 8. Firstly at a time point t1, the vehicle driver operates the shift lever of the automatic transmission 12 to perform changeover from the P (parking) to the D (drive) shift position. When that occurs, the ECU 33 sets an initial value of target output shaft rotation angle θ2tg, corresponding to the target shift position (in this case, the D shift position), e.g., by reading out the value from a stored table, as described for the first embodiment. The ECU 33 then calculates an initial value of the target motor rotation angle θ1tg based on the difference (θ2−θ2tg) between the detected output shaft rotation angle θ2 and the target output shaft rotation angle θ2tg at that time point t1. This will be referred to as the "first setting of the target motor rotation angle θ1tg". The ECU 33 then begins to perform driving of the motor 13, by controlling the motor drive circuits 38, 39 in accordance with the detected motor rotation angle θ1, as described for the first embodiment.

Subsequently at a time point t2, when the motor 13 has rotated by a sufficient amount to take up the backlash in the rotation transmission system, the output shaft 15 begins to rotate together with the motor 13, so that the detected output shaft rotation angle θ2 begins to change. Thereafter, as the output shaft 15 and motor 13 continue to rotate together (i.e., unaffected by the backlash), the value of θ2 reaches a value whereby the threshold value Mov is attained, at time point t3. When this occurs, compensation is applied to the target motor rotation angle θ1tg, in accordance with the difference amount (θ2−θ2tg) at that point in time, to obtain an updated (final) value of target value of motor rotation angle. This will be referred to as the "second setting of the target motor rotation angle θ1tg".

Thereafter, the target motor rotation angle θ1tg is held unchanged, until the detected motor rotation angle θ1 coincides with the (final) target value θ1tg. When this occurs, the ECU 33 halts the rotation of the motor 13. This completes the shift position changeover operation.

With the second embodiment described above, the main routine shown in FIG. 5 is executed repetitively in the same manner as for the first embodiment. In step 100 of the main routine, with the second embodiment, the target motor rotation angle setting routine shown in FIG. 9 is executed, to set the target motor rotation angle θ1tg. Step 110 of the main routine is then executed, as the motor F/B control routine of FIG. 7, to bring the rotation angle of the motor 13 to the target motor rotation angle θ1tg.

Figure 9:
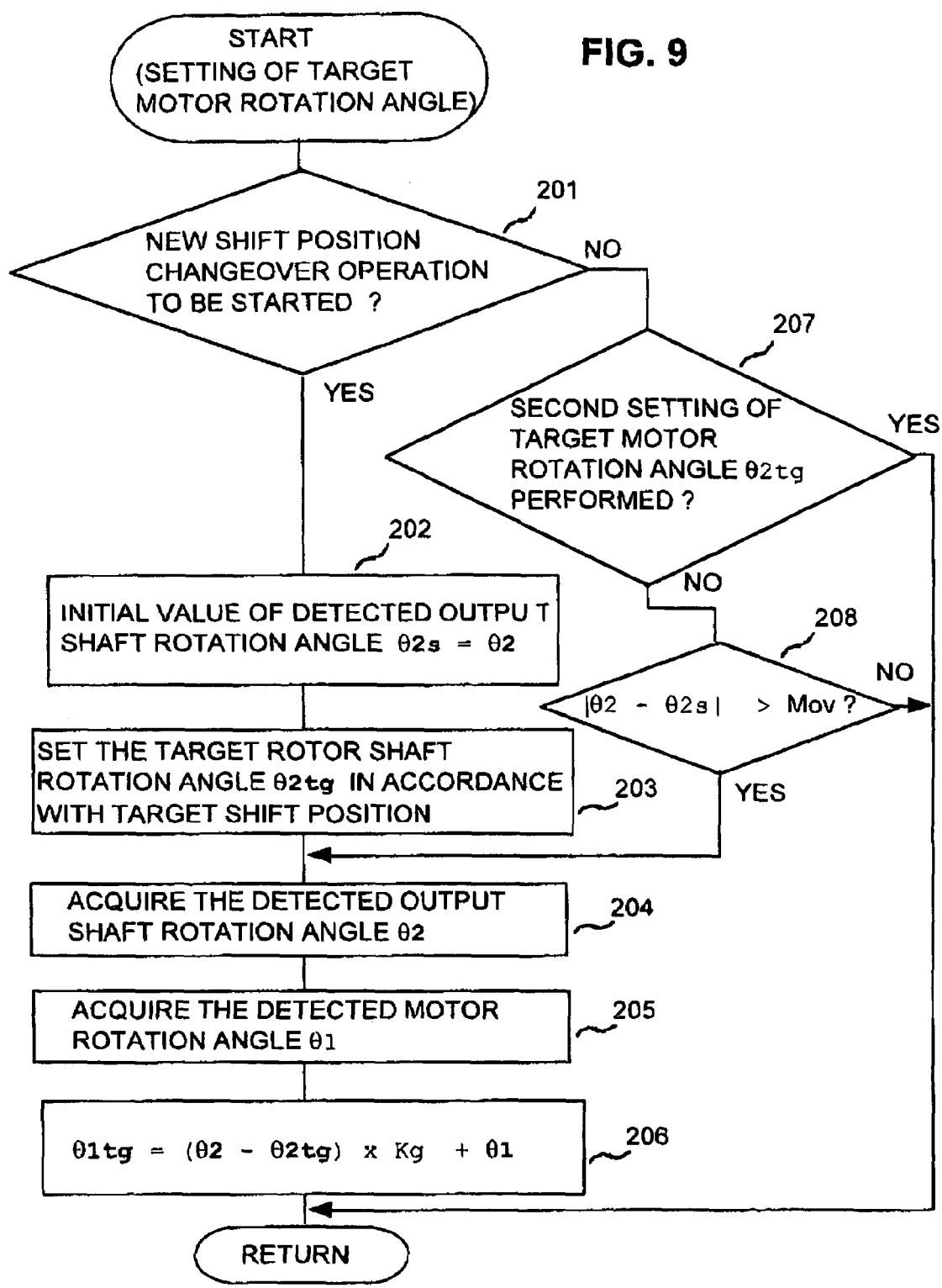
FIG. 9 is a flow diagram of a target motor rotation angle setting routine used in the second embodiment.

When the target motor rotation angle setting routine of FIG. 9 is entered, then firstly in step 201, a decision is made as to whether a time point (such as ti in the example of FIG. 8) has been reached at which a shift position changeover operation is to be started, i.e., a changeover command has been newly received, or it has been newly detected that the target output shaft rotation angle and the detected output shaft rotation angle are not identical. If this is the case, then step 202 is executed, in which the value of detected output shaft rotation angle θ2 which is obtained from the output shaft sensor 16 at that time is stored in memory, designated as the initial value of θ2s. Thereafter, the processing of steps 203 to 206 is executed, with these respectively corresponding to the steps 101, 102, 105 and 106 in the flow diagram of FIG. 6 for the first embodiment. An initial target value of motor rotation angle is thereby established in step 206. This will be referred to as the "first setting of the target motor rotation angle θ1tg".

Subsequently, each time that this routine is re-entered (until the completion of this shift position changeover operation), a NO decision is made in step 201, and step 207 is then executed, to judge whether the target motor rotation angle θ1tg has already been set for a second time (since the commencement of this shift position changeover operation). If θ1tg has not already been set for a second time, then step 208 is executed, in which a decision is made as to whether the absolute value of (θ2−θ2s) has reached the predetermined threshold value Mov. If there is a NO decision in step 208, then the processing of this routine is ended.

In that way, the first value that is set for the target motor rotation angle θ1tg (after the commencement of this shift position changeover operation) is held unchanged until the motor 13 has been driven from an initial rotation angle to a rotation angle whereby the threshold value Mov is attained.

At the time point when the detected output shaft rotation angle θ2 reaches a value whereby |θ2−θ2s| attains the threshold value Mov, so that a YES decision is reached in step 208, the processing of steps 204 to 206 is executed, to perform setting (i.e., compensation) of the target motor rotation angle θ1tg for the second time, based on the difference amount (θ2−θ2tg) between the detected output shaft rotation angle θ2 and the target output shaft rotation angle θ2tg.

Thereafter, the final value for θ2 that has thus been set is held unchanged, until the next shift position changeover operation is performed.

Thus with the second embodiment, similar effects can be obtained to those of the first embodiment. However with the second embodiment, while the motor 13 is being driven, setting of the value of the target motor rotation angle θ1tg is performed only twice, i.e., initially and at the point when the detected output shaft rotation angle θ2 attains the threshold value Mov. Thus, the number of processing operations that must be executed before setting the final value of θ1tg can be minimized, so that the processing load of the ECU 33 is reduced.

With a first alternative form of the second embodiment, compensation is applied to the target motor rotation angle θ1tg as follows, referring to the example of FIG. 8. Firstly, a shift position changeover operation is started, as described above for the second embodiment. At the point when the detected output shaft rotation angle θ2 attains a value whereby the threshold value Mov is reached, the value of the detected motor rotation angle θ1 at that time point is registered, designated as θov. The amount of backlash in the rotation transmission system, expressed as an amount of angular rotation Bm of the motor 13, is then obtained as a "learned" value, by calculation using the following equation:

$$Bm = \theta ov - Mov \times Kg \qquad (2)$$

That learned value of backlash can then be used, the next time that the target motor rotation angle θ1tg is set in accordance with a target shift position, to compensate θ1tg for the backlash amount, before driving of the motor 13 begins.

With a second alternative form of the second embodiment, the motion of the control object (the spool valve member 24) is directly detected, for example by a device such as a linear potentiometer that is directly coupled to the spool valve member 24, and produces output values that vary linearly in accordance with linear motion of the spool valve member 24. Other than in the fact that motion of the control object is directly detected, with a target position of the control object being established rather than a target output shaft rotation angle, the operation of this second alternative form of the second embodiment is identical to that of the second embodiment, so that detailed description is omitted.

Third Embodiment

Figure 10:
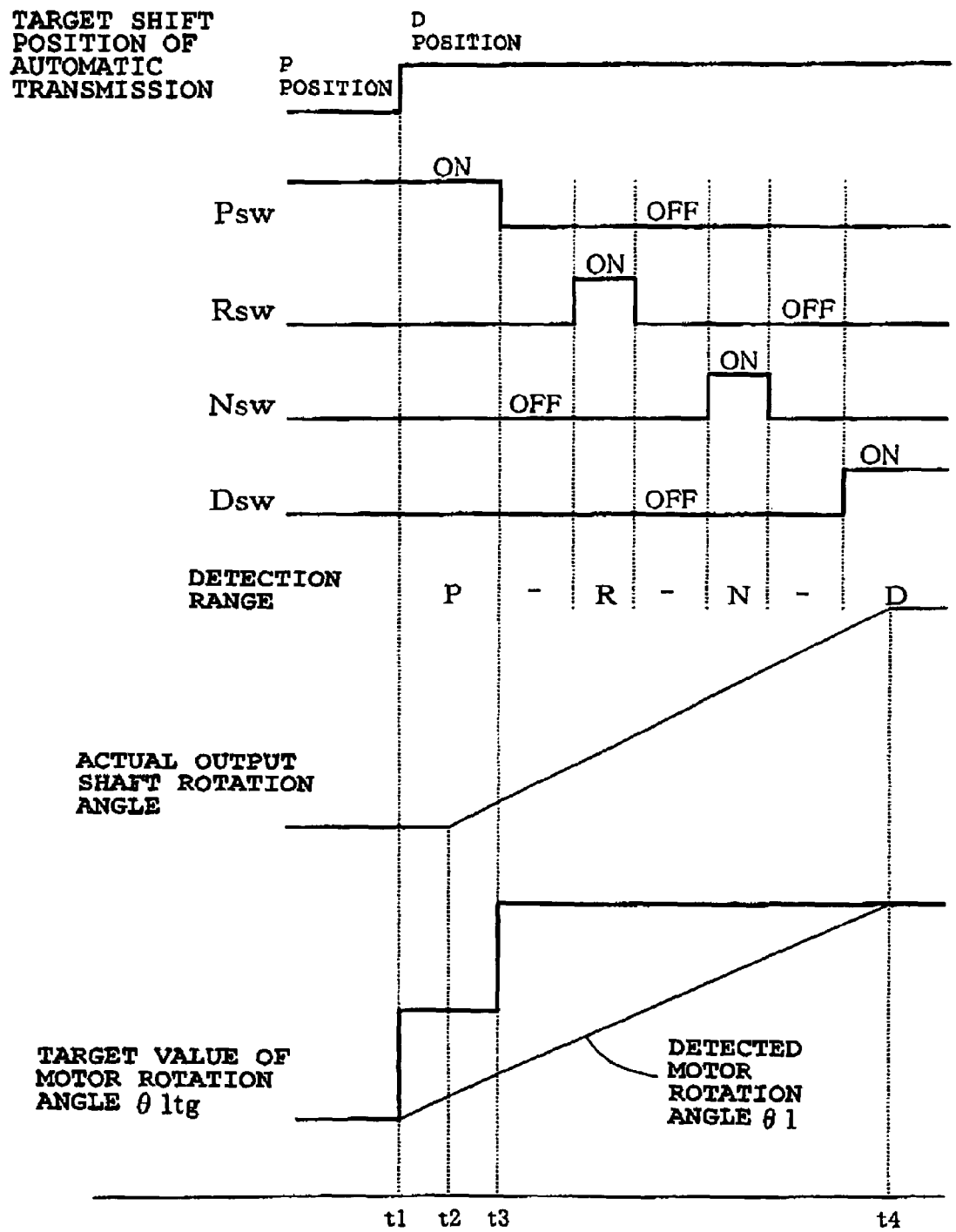
FIG. 10 is a timing chart showing an example of a control operation performed by a third embodiment.
Figures 11, 13:
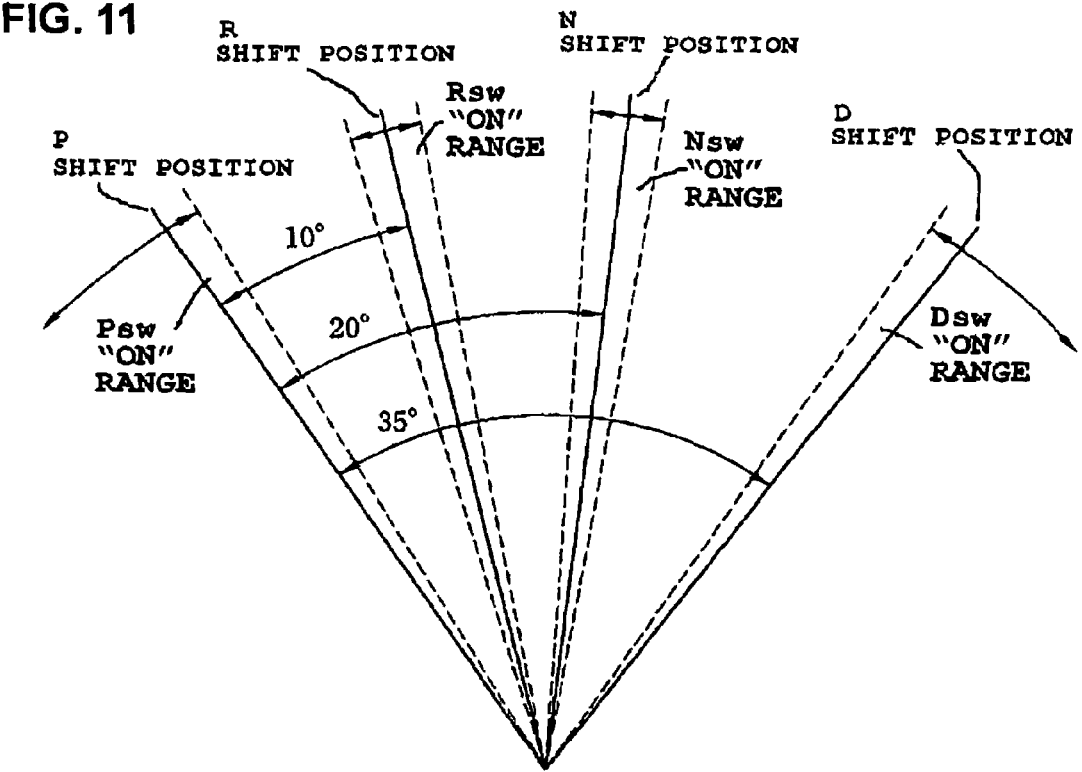
FIG. 11 is a diagram for describing respective ON ranges of output signals produced from an output shaft sensor, with the third embodiment.
FIG. 13 shows a map of stored values used in setting a target motor rotation angle, with the third embodiment; and, FIG. 14 is a flow diagram of a target motor rotation angle setting routine used in a fourth embodiment.

A third embodiment of a motor control apparatus will be described referring to FIGS. 10 to 13. With the first and second embodiments above, the output shaft sensor 16 is formed of a device such as a rotary potentiometer which produces an output voltage that changes linearly in accordance with changes in the angular position of the output shaft 15. With the third embodiment, as shown in FIGS. 10 and 11, the output shaft sensor is configured as a set of four switch sections Psw, Rsw, Nsw, Dsw, respectively corresponding to the P, R, N and D shift positions of the automatic transmission. Each of these switch sections Psw, Rsw, Nsw, Dsw is coupled to the output shaft 15 such as to be set in an ON state, in which an output signal at a level referred to as the ON level is produced, when the output shaft 15 is within a specific corresponding range of angular positions. For each switch section, the corresponding range includes an angular position of the output shaft 15 whereby the corresponding one of the shift positions P, R, N or D is selected. Each switch section produces a low level, i.e., OFF level output, so long as the position of the output shaft 15 is outside the angular range corresponding to that switch section. Each transition between ON and OFF levels of the signal from a switch section corresponds to a limit position of the angular range of ON signal values for that switch section, and corresponds to a specific known rotation angle of the output shaft 15.

This can be understood by referring to FIG. 11, illustrating an example of such a set of angular ranges in which the respective switch sections produce an ON output signal, and showing the correspondence between these angular ranges and respective shift positions of the automatic transmission.

With this embodiment, the shift position of the automatic transmission is detected based on the one of the switch sections Psw, Rsw, Nsw, Dsw that is currently producing an ON level signal. The remaining hardware configuration of this embodiment is identical to that for the preceding embodiments.

The output shaft sensor formed of the switch sections Psw, Rsw, Nsw, Dsw can accurately detect the current rotation angle of the output shaft 15 only when the output shaft 15 rotates to a position whereby a transition between the OFF and ON levels occurs for the output signal of a switch section. Depending upon the direction of rotation of the output shaft 15 when detection occurs, each transition will be detected either as a rising edge (OFF to ON transition) or a falling edge (ON to OFF transition).

When the ECU 33 detects such a transition, a map of rotation angle values (prepared and stored beforehand in a memory of the ECU 33) is referred to, in accordance with:

(a) whether a rising edge or falling edge has been detected,
(b) the identity of the switch section corresponding to the signal for which the transition has occurred, and
(c) the target shift position at that time.

A value corresponding to that combination of three parameters is then read out from the map, expressing a target value of motor rotation angle θ1tg, which is then set as an updated value of θ1tg.

FIG. 13 shows an example of a map for use as described above. In the set of rows designated as "Detected Edge", each row that is designated as "OFF" contains values of target motor rotation angle θ1tg that are to be read out when it is detected that a falling edge of the output signal from one of the switch sections Psw, Rsw, Nsw, Dsw has been detected. Similarly, each row designated as "ON" contains values of θ1tg that are to be read out when it is detected that a rising edge of such an output signal has occurred.

Referring to the timing diagram example of FIG. 10 for this embodiment, it is assumed that a shift position changeover operation is to be performed from the P to the D position, with the D position becoming the target shift position at time point t1. Firstly, in the same way as described for the preceding embodiments, an initial value of target value of motor rotation angle θ1tg is derived based on the target shift position (or target output shaft rotation angle) the detected shift position (which corresponds to a known specific rotation angle of the output shaft 15), e.g., by referring to a stored map. This will be referred to as the "first setting of the target motor rotation angle θ1tg". Driving of the motor 13 in accordance with that target value is then started.

Thereafter, a point is reached (time point t3 in FIG. 10) when a first transition of an output signal from a switch section of the output shaft sensor is detected. In this example, the first transition is detected as a falling edge of the output signal from the switch section Psw.

At that point, a value for the target output shaft rotation angle θ2tg is derived, by readout from the map (referred to in the following as the second-setting map) shown in FIG. 13. In that case, since:

(a) the target shift position is D,
(b) the first signal transition that is detected is a falling edge, and
(c) that edge has occurred for the signal of the Psw switch section, a value 33.5° will be read out from the map of FIG. 13, to be set for the target motor rotation angle θ1tg at that point, as the final value of θ1tg. This operation will referred to as the "second setting of the target motor rotation angle θ1tg".

Driving of the motor 13 in accordance with that target rotation angle is then started. This continues, with θ1tg held fixed, until the detected motor rotation angle θ1 coincides with θ1tg, at time point t4 in FIG. 10.

Driving of the motor is then halted, and this completes the shift position changeover operation.

The extents of the respective angular ranges of rotation of the output shaft 15 for which the switch section Psw, Rsw, Nsw, Dsw produce an ON level output signal are predetermined such that the amount of change in rotation angle of the motor 13 which occurs in the interval (t1 to t3 in FIG. 10) between the start of driving the motor 13 (upon commencement of a shift position changeover operation) until a first edge of a switch section output signal is detected, will be greater than the amount of backlash in the rotation transmission system. Thus, it is ensured that the output shaft 15 and the motor 13 will begin to rotate together at some point during the interval t1 to t3. This is illustrated in FIG. 10, in which the output shaft 15 begins to rotate at the time point t2.

Hence, it is ensured that the second setting of the target motor rotation angle θ1tg is performed in a condition in which all of the backlash in the rotation transmission system has been taken up. Thus, similar effects to those of the second embodiment can be obtained.

In the above description it is assumed that the target shift position (P, R, N or D) is used as a parameter for referencing a map of target value of motor rotation angle values such as that of FIG. 13. However it will be understood that it would be equally possible to configure such a map whereby target output shaft rotation angles (i.e., corresponding to respective shift positions) are utilized instead of target shift positions.

Figure 12:
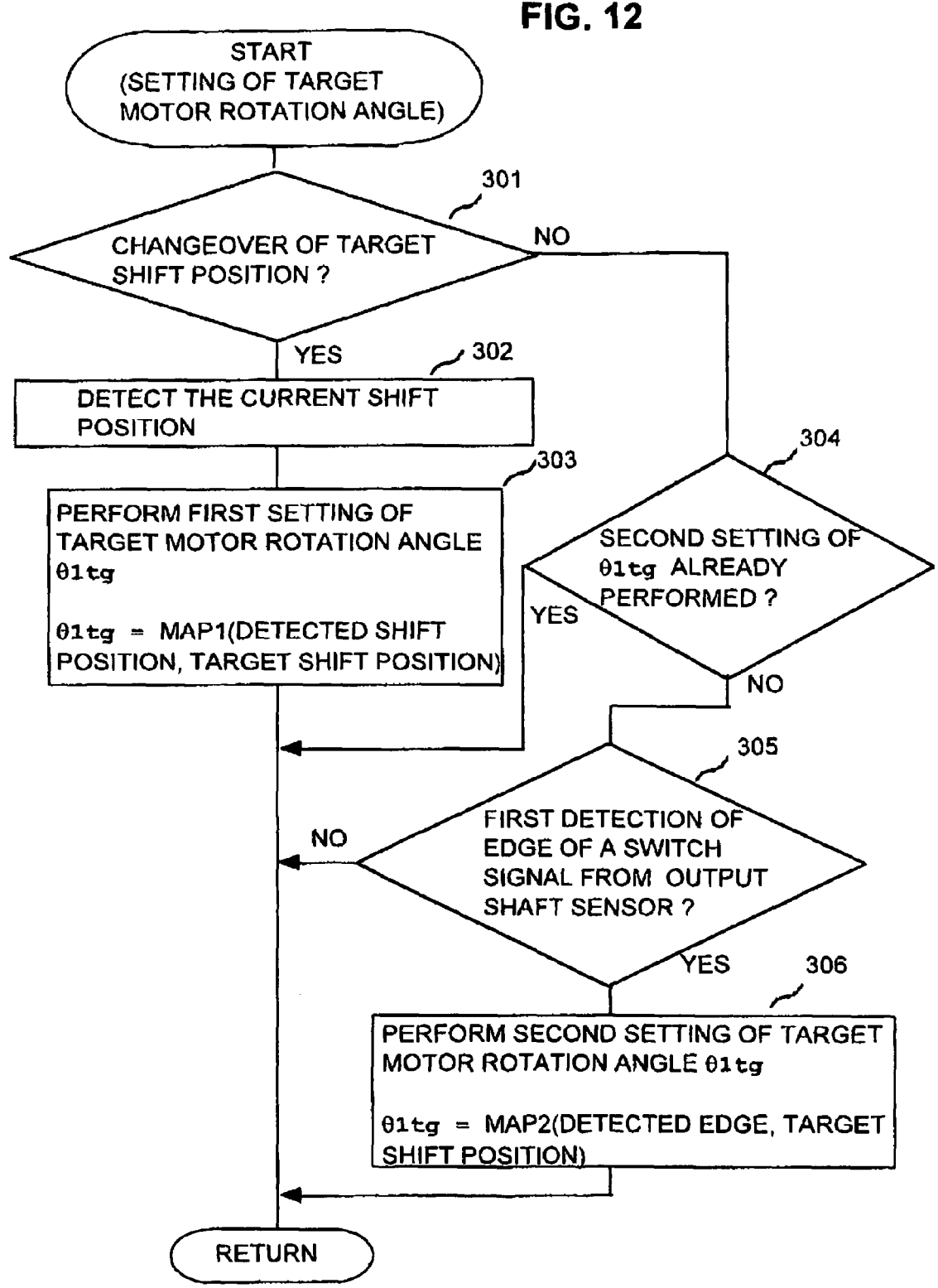
FIG. 12 is a flow diagram of a target motor rotation angle setting routine used in the third embodiment.

With the third embodiment described above, the target motor rotation angle setting routine shown in FIG. 12 is executed as step 100 of the main routine of FIG. 5, for setting the value of the target motor rotation angle θ1tg. In each execution of the main routine, following step 100, the motor F/B control routine of FIG. 7 is executed as step 110 of FIG. 5, for driving the motor 13 in accordance with the target motor rotation angle θ1tg that has been set.

In the routine of FIG. 12, step 301 is first executed to determine whether a time point (e.g., time point t1 in FIG. 10)

has been reached at which the target shift position has been changed. If so, shift position 302 is executed, in which a judgement is made as to which of the switch sections Psw, Rsw, Nsw, Dsw is producing an ON level signal, to thereby detect the current shift position of the automatic transmission. Operation then advances to step 302, in which the first setting of the target motor rotation angle θ1tg is performed, by readout from the aforementioned initial-setting map, using the detected shift position and the target shift position as map parameters. Driving of the motor 13 is then performed, in each of successive executions of the routine of step 110 of FIG. 5.

Thereafter, each time that the routine of FIG. 12 is re-entered in subsequent repetitions of the main routine of FIG. 5, a NO decision is reached in step 301, and operation proceeds to step 304, in which a decision is made as to whether a second setting of the target motor rotation angle θ1tg (as described above) has already occurred. If the second setting has not yet been performed, operation advances to step 305, in which a decision is made as to whether a first edge of an output signal from one of the switch sections Psw, Rsw, Nsw, Dsw is detected. If such an edge is detected, operation advances to step 306, in which the aforementioned second-setting map (e.g., of FIG. 13) is referred to, using the detected edge, the identity of the switch section corresponding to the detected edge and the target shift position, as map parameters, to obtain a value to be set as the target motor rotation angle θ1tg. The second setting operation is thereby performed.

The value that has thus been set for θ1tg is thereafter left unchanged, until a subsequent changeover of the shift position is performed.

As can be understood from the above description, with the third embodiment described above, similar effects to those of the second embodiment can be obtained. Although the third embodiment is described above as utilizing a set of switch sections respectively corresponding to the shift positions, to constitute the output shaft motion sensor, it will be understood that the function of such a set of switch sections could readily be implemented by a rotary switch, with the switch contacts respectively corresponding to the "switch sections".

With an alternative form of the third embodiment, the motion of the control object (the spool valve member 24) is directly detected, by a set of switch sections, respectively corresponding to the shift positions, that are directly coupled the spool valve member 24, with each switch section being actuated to produce an ON level signal while the spool valve member 32 is within a specific corresponding range of positions. Other than in the fact that motion of the control object is directly detected, with a target position of the control object being established rather than a target output shaft rotation angle, the operation of this alternative form of the third embodiment is essentially identical to that of the second embodiment, so that detailed description is omitted.

Fourth Embodiment

Figure 14:
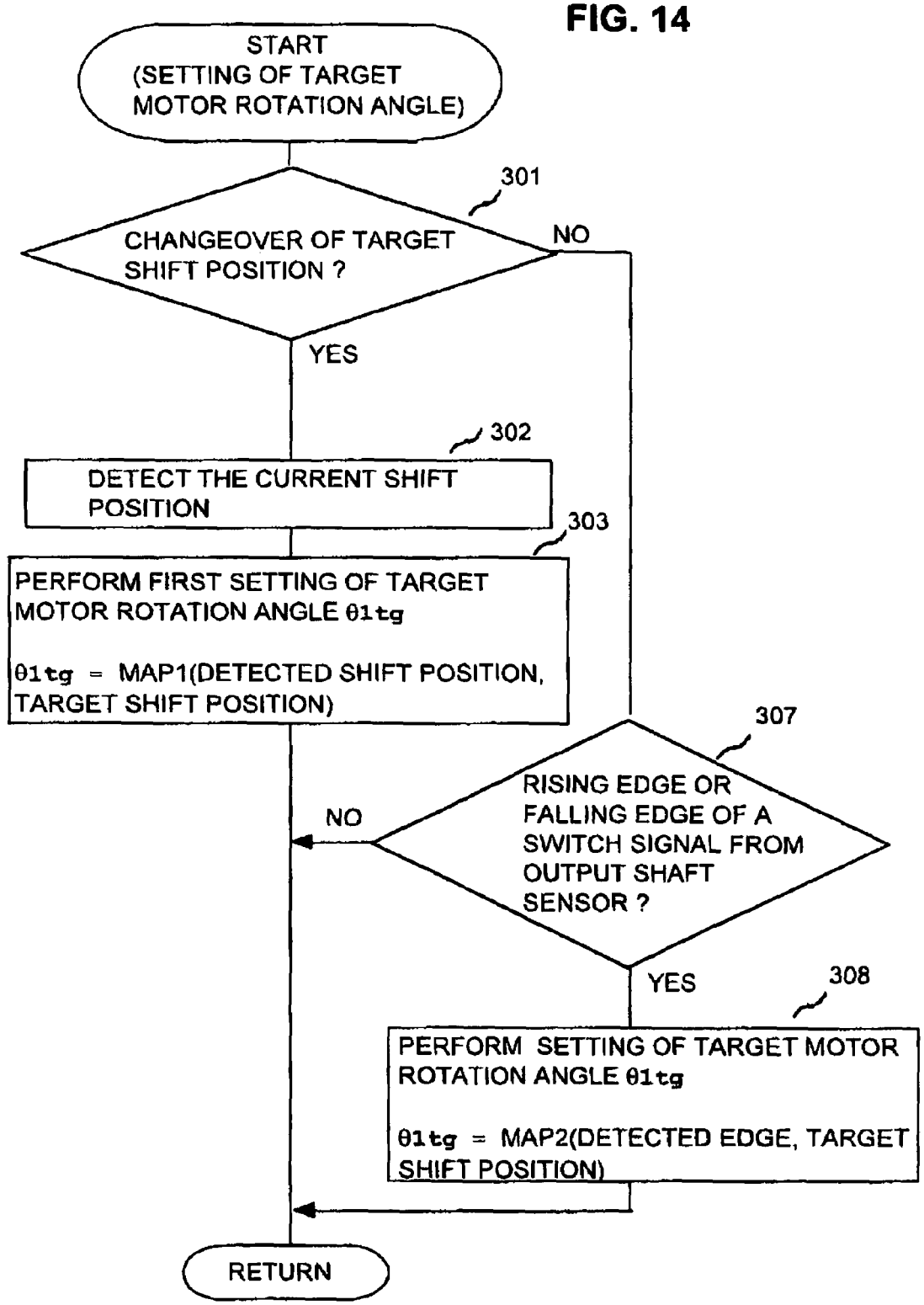

With the third embodiment, after driving of the motor 13 has commenced, the second setting of the target motor rotation angle θ1tg is performed only when a first edge of an output signal from one of the switch sections Psw, Rsw, Nsw, Dsw constituting the output shaft sensor is detected. Subsequently, that value of θ1tg is held fixed until completion of the shift position changeover operation. A fourth embodiment will be described, which is basically similar to the third embodiment, employing a map of values for θ1tg such as that of FIG. 13. However the fourth embodiment utilizes a target motor rotation angle setting routine as shown in FIG. 14, in place of the routine of FIG. 12 for the third embodiment. With the fourth embodiment, while the motor 13 is being driven for rotation during a shift position changeover operation, resetting of the target motor rotation angle θ1tg is performed each time a rising edge or falling edge of an output signal from a switch section of the output shaft sensor (if there is a corresponding rotation angle value in the map of FIG. 13). In the routine of FIG. 14, steps 307, 308 are utilized in place of steps 304 to 306 in the routine of FIG. 12. The remaining steps in FIG. 14 are identical to the correspondingly numbered steps in the routine of FIG. 12.

If this is not the first execution of the routine immediately after a shift position changeover has been specified, so that a NO decision is reached in step 301, step 307 is then executed, in which a decision is made as to whether a rising edge or falling edge of an output signal from any of the switch sections of the output shaft sensor has been detected. If an edge has been detected, operation advances to step 308 in which the target motor rotation angle θ1tg is reset, as a value that is read out from the aforementioned second-setting map, e.g., that of FIG. 13, in accordance with whether a rising edge or a falling edge has been detected, the switch section producing the output signal for which the edge has occurred, and the target shift position.

With this routine of FIG. 14 of the fourth embodiment, if an angular position deviation of the output shaft 15 should arise for some reason while the motor 13 is being driven, compensation will be appropriately applied to the target motor rotation angle θ1tg, since θ1tg is reset each time that an edge of an output signal from any switch section of the output shaft sensor is detected.

For example if changeover is to be performed from the P to the N shift position, using the map of FIG. 13, then θ1tg would initially be set to 18.5° when the first edge is detected (falling edge of signal from the Psw switch section), then would be reset to 11.5° when the next edge is detected (rising edge of signal from the Rsw switch section), and reset to 8.5° at the next detected edge, i.e., a falling edge of the signal from the Rsw switch section. (With the map example of FIG. 13, no resetting can occur as a result of a signal transition of the Nsw switch section, in this case).

As can be understood from the above description, the basic features common to each of the embodiments are as follows. Firstly, when a new target output shaft rotation angle is established, the motor rotation angle and output shaft rotation angle at that time are each detected, and an initial target motor rotation angle is then derived (by calculation, or from a stored map) based on a difference between the detected output shaft rotation angle and the target output shaft rotation angle.

The motor then begins to be driven, for rotation towards the initial target motor rotation angle. At least one further detected value of output shaft rotation angle is derived thereafter, which is used to detect a specific time point at which to perform compensation of the initial target motor rotation angle, to obtain a final target value of motor rotation angle. In the example of FIG. 4 for the first embodiment, that specific time point is t2, in the example of FIG. 8 for the second embodiment the time point is t3, in the example of FIG. 10 for the third embodiment the time point is t3, and (although not specifically shown) in the example of FIG. 10 as applied to the fourth embodiment, the time point would correspond to the right-side falling edge of the Nsw switch signal. The final target value of motor rotation angle is then derived at that time point, based on the difference between the detected output shaft rotation angle and the target output shaft rotation angle at that time. The motor is then driven to attain coincidence between the final target motor rotation angle and detected motor rotation angle. The target value of output shaft angle may be expressed directly, or in terms of a position of a control object that is driven by the output shaft.

The above embodiments have been described for application to an automatic transmission having P, R, N, and D shift positions. However the invention would be equally applicable to a shift position switching mechanism of an automatic transmission that also has a low (L) shift position, or only two shift positions, P and NotP.

It should be noted also that a motor control apparatus according to the present invention is not limited in application to an SR motor which actuates an automatic transmission shift position switching mechanism, and would be applicable to controlling SR motors or other types of motors used in various other applications.

What is claimed is:

1. A motor control apparatus comprising motor rotation angle detection means for deriving a detected rotation angle of a motor as a rotation angle of a motor shaft of said motor, and output shaft rotation angle detection means for deriving a detected rotation angle of an output shaft which drives a control object, said motor shaft being coupled through a rotation transmission system to said output shaft, said motor control apparatus controlling said motor for rotating said motor shaft from said detected rotation angle of the motor into coincidence with a target rotation angle of the motor, wherein said motor control apparatus comprises:
target motor rotation angle compensation means for applying compensation to said target rotation angle of the motor during rotation of said motor based upon values of said output shaft rotation angle that are successively obtained by said output shaft rotation angle detection means during the rotation of the motor.

2. A motor control apparatus according to claim 1, wherein said compensation is selectively applied, during said rotation of said motor shaft, at one or more time points each determined in accordance with a current value of said detected output shaft rotation angle.

3. A motor control apparatus according to claim 1, wherein:
said output shaft rotation angle detection means comprises means for generating output values that vary linearly in accordance with variation of said rotation angle of said output shaft; and,
said target motor rotation angle compensation means performs said compensation of said target rotation angle of the motor in accordance with a difference between said detected output shaft rotation angle and a target value of output shaft rotation angle.

4. A motor control apparatus according to claim 3, comprising means for detecting, subsequent to a commencement of rotation of said motor shaft, a specific time point of commencement of variation between successively derived values of said detected output shaft rotation angle, wherein said target motor rotation angle compensation means performs a final operation of compensation of said target rotation angle of the motor when said time point is detected.

5. A motor control apparatus according to claim 4, wherein said target motor rotation angle compensation means repetitively applies compensation to said target rotation angle of the motor in accordance with a difference between said detected output shaft rotation angle and said target output shaft rotation angle, from said commencement of motor shaft rotation until said specific time point is reached.

6. A motor control apparatus according to claim 1, wherein said target motor rotation angle compensation means applies compensation to said target rotation angle of the motor in accordance with a difference between said detected output shaft rotation angle and said target output shaft rotation angle, at a time point when a difference between a current value of said detected output shaft rotation angle and a value of said detected output shaft rotation angle at a time point of commencement of rotation of said motor shaft attains a predetermined threshold value.

7. A motor control apparatus according to claim 1, wherein:
said output shaft rotation angle detection means comprises a plurality of switch devices respectively coupled to said output shaft, each said switch device being actuated to produce a switch signal at an ON level while said output shaft is within a range of angular positions that is specific to said each switch device, and otherwise producing said switch signal at an OFF level; and,
said target motor rotation angle compensation means performs compensation of said target rotation angle of the motor at a time point when a transition of a switch signal of one of said switching devices between said OFF and ON levels occurs.

8. A motor control apparatus according to claim 7, comprising memory means having stored therein a map of values of target rotation angles of the motor, for use in said compensation, wherein parameters of said map comprise:
a direction of said switch signal transition,
an identity of said switching device for which said switch signal transition occurs, and
said target output shaft rotation angle.

9. A motor control apparatus according to claim 1, wherein said motor is a synchronous type of motor having a plurality of phase windings, and said motor control apparatus comprises means for energizing said phase windings in a sequence determined in accordance with said target rotation angle of the motor.

10. A motor control apparatus according to claim 1, wherein said control object is a shift position changeover apparatus of a vehicle automatic transmission.

11. A motor control apparatus comprising motor rotation angle detection means for deriving a detected rotation angle of a motor as a rotation angle of a motor shaft of said motor, and output shaft rotation angle detection means for deriving a detected rotation angle of an output shaft which drives a control object, said motor shaft being coupled through a rotation transmission system to said output shaft, said motor control apparatus controlling said motor for rotating said motor shaft from said detected rotation angle of the motor into coincidence with a target rotation angle of the motor,
wherein said motor control apparatus comprises: target motor rotation angle compensation means for applying compensation to said target rotation angle of the motor based upon at least one detection value obtained by said output shaft rotation angle detection means; and
said target motor rotation angle compensation means comprises means for multiplying a difference between said detected output shaft rotation angle and said target output shaft rotation angle by a value of speed reduction ratio of said rotation transmission system, adding said detected rotation angle of the motor to a product of said multiplication, to obtain as a result an updated value of target motor rotation angle, and setting said target rotation angle of the motor to said updated value.

12. A motor control apparatus comprising motor rotation angle detection means for deriving a detected rotation angle of the motor as an angular position of a shaft of a motor, said motor shaft being coupled through a rotation transmission system to an output shaft which drives a control object, said motor control apparatus controlling said motor for rotating said motor shaft from said detected rotation angle of the motor into coincidence with a target rotation angle of the motor, and comprising position detection means for detecting a position of said control object;

wherein said motor control apparatus comprises target motor rotation angle compensation means for compensating said target angular position of said motor shaft based upon a detection result obtained by said position detection means, with said compensation being selectively applied, during said rotation of said motor shaft, at one or more time points that are each determined in accordance with a currently detected position of said control object.

13. A method of controlling a motor having a motor shaft that is coupled through a rotation transmission system to an output shaft, the method comprising:

deriving a detected rotation angle of the motor and a detected output shaft rotation angle, and calculating an initial target rotation angle of the motor based on a difference between an initial value of said detected output shaft rotation angle and a target output shaft rotation angle;

commencing driving said motor to rotate said motor shaft towards said initial target rotation angle of the motor, based on at least one subsequently obtained value of said detected output shaft rotation angle, detecting a specific time point subsequent to said motor shaft rotation commencement at which to perform compensation of said initial target rotation angle of the motor, applying said compensation, based on a difference between a value of said detected output shaft rotation angle derived at said specific time point and said target output shaft rotation angle, to obtain a final target rotation angle of the motor, and driving said motor to attain said final target rotation angle of the motor.

14. A method of controlling a motor as claimed in claim 13, comprising performing at least one operation of target motor rotation angle compensation at a time point intermediate between said commencement of motor shaft rotation and said specific time point at which said final target rotation angle of the motor is obtained.

15. A method of controlling a motor as claimed in claim 13, wherein said specific time point is detected as a point of commencement of change between successively derived values of said detected output shaft rotation angle.

16. A method of controlling a motor as claimed in claim 13, wherein said specific time point is detected as a time point when a difference between a current value of said detected output shaft rotation angle and a value of said detected output shaft rotation angle at said commencement of rotation attains a predetermined threshold value.

17. A method of controlling a motor as claimed in claim 13, wherein said specific time point is detected as a point at which said detected output shaft rotation angle coincides with a predetermined value.

* * * * *